Feb. 20, 1934.  E. S. MacPHERSON  1,947,787
FRONT END CONSTRUCTION
Filed July 25, 1932  2 Sheets-Sheet 1
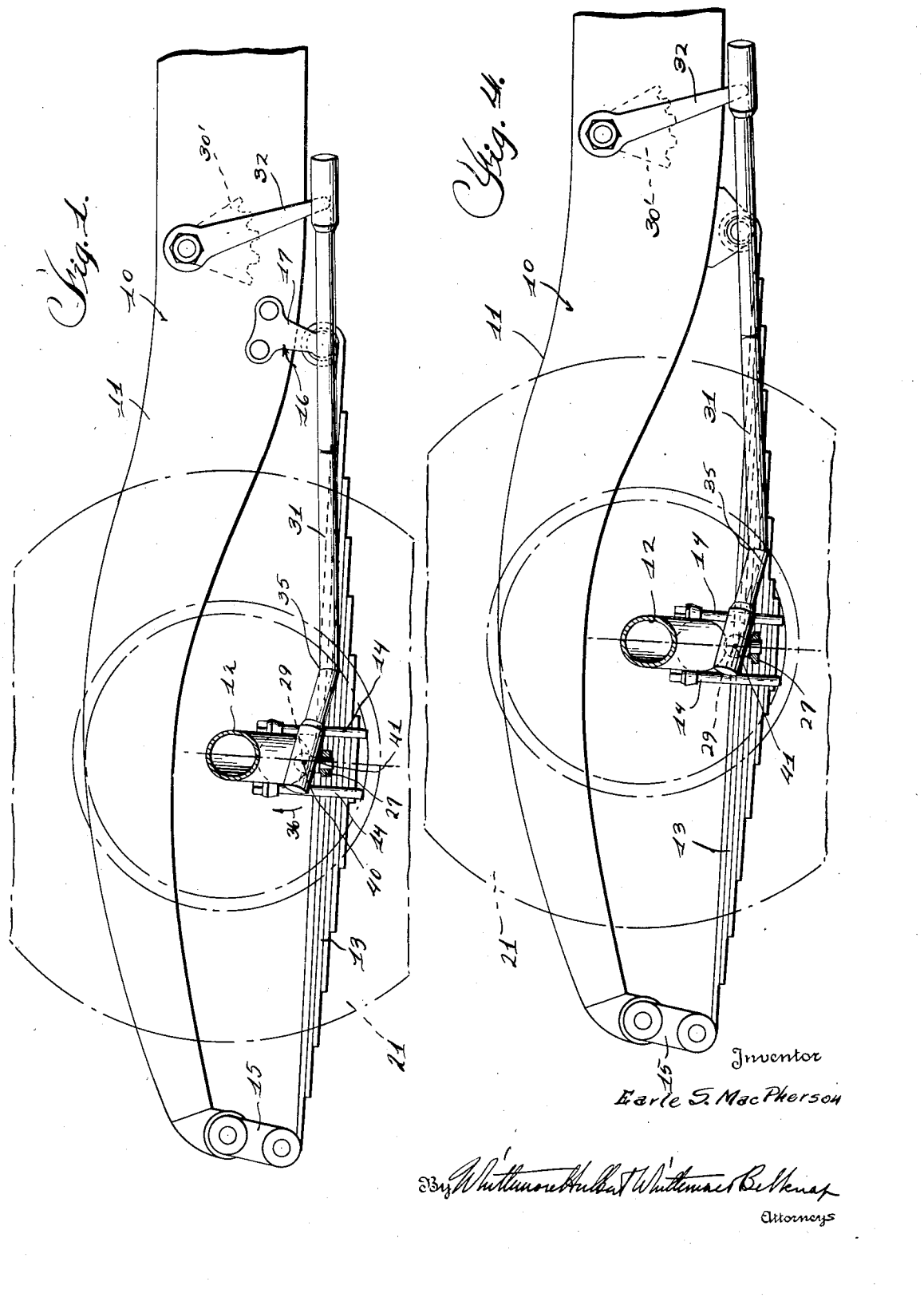
Inventor
Earle S. MacPherson

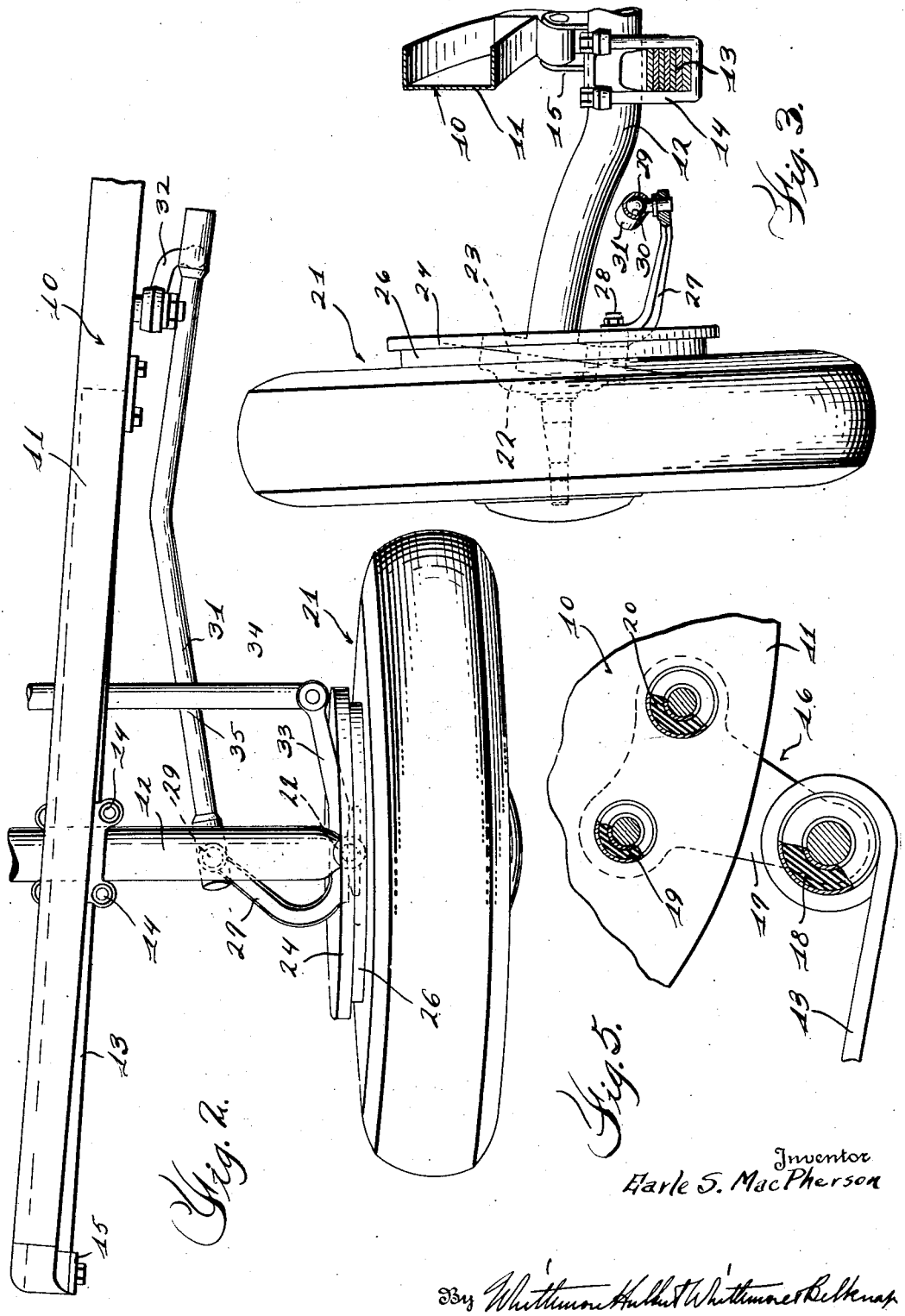

Patented Feb. 20, 1934

1,947,787

UNITED STATES PATENT OFFICE 1,947,787

FRONT END CONSTRUCTION

Earle S. MacPherson, Detroit, Mich., assignor to Hupp Motor Car Corporation, Detroit, Mich., a corporation of Virginia Application July 25, 1932. Serial No. 624,591

9 Claims. (Cl. 280—87)

This invention relates to vehicles of the type having ground engaging wheels provided with brakes and having steering mechanism operatively connected to the wheels.

Although it is well established that the introduction of low pressure tires and brakes for the steering wheels of a vehicle constituted a valuable advance in the art of automotive engineering, nevertheless, it is equally well established that the application of these features to a vehicle has a detrimental effect on the steering of the vehicle.

The association of brakes with the steering wheels materially affects the efficient operation of the steering mechanism since the torque reaction of the brakes when applied causes a flexing of the springs on the steering axle and tends to rock the axle about an axis extending longitudinally thereof. Rocking of the axle transmits a corresponding rocking movement to the steering knuckle about the aforesaid longitudinal axis, and since the latter is held from oscillation about said axis by the operator through the medium of the steering mechanism, the same will be compelled to turn about the axis of the king pin and cause a diving of the front wheels. The foregoing is, of course, a serious objection, and in order to eliminate the same, an effort has been made to definitely locate the longitudinal axis about which the axle rocks when the brakes are applied and to position the pivotal connection between the drag link and steering knuckle upon this axis. In arrangements where the pivotal connection between the drag link and knuckle is located on the longitudinal axis about which the axle rocks when the brakes are applied, rocking of the knuckle with the axle has practically no effect on the steering.

It is well established that the introduction of low pressure tires on the steering wheels of a vehicle materially aggravated the tendency of the steering wheels to wobble or shimmy during the operation of the vehicle. In order to minimize shimmy of the steering wheels and prevent this action from being transmitted through the steering mechanism to the control for the wheels, provision has been made for connecting the end of the axle on the steering mechanism side of the vehicle to the frame in such a manner as to permit limited movement of the aforesaid end of the axle longitudinally of the frame. In vehicles as now commercially produced, the connection aforesaid is accomplished by pivotally securing opposite ends of the spring, associated with the steering mechanism end of the axle, to the frame through the medium of pivotally mounted shackles. While this arrangement has achieved considerable recognition in the trade for minimizing shimmy of the steering wheels, nevertheless, it has a detrimental effect on the steering mechanism, especially when the brakes are applied, since the reaction of the latter, aside from effecting a rocking movement of the axle in the manner specified above, also causes a displacement of the axle longitudinally of the frame. Longitudinal displacement of the steering end of the axle obviously effects a corresponding movement of the knuckle associated therewith, and since the drag link is virtually prevented from movement with the knuckle by the operator, it necessarily follows that the latter is compelled to turn about its pivotal connection with the axle. The location of the pivotal connection between the steering knuckle and drag link in the longitudinal axis about which the axle rocks when the brakes are applied does not rectify the error introduced in the steering mechanism by the antishimmy means.

It is therefore one of the principal objects of the present invention to provide an arrangement whereby the reaction of the steering axle to the braking will not affect the steering of the vehicle.

The present invention contemplates obtaining the foregoing results by locating the pivotal connection between the drag link and steering knuckle arm in such a position that rocking of the axle upon application of the brakes tends to rock the aforesaid pivot in a corresponding direction, and the longitudinal displacement of the axle effected by the brake application through the medium of the antishimmy device tends to rock the said pivot in the opposite direction. In accordance with this invention, the location of the pivotal connection set forth above is accurately predetermined so that the two forces acting upon this pivot tending to move the same in opposite directions are substantially neutralized.

A further object of the present invention resides in the provision of an axle for the steering wheels of the vehicle substantially tubular in cross section so as to eliminate any tendency for the axle to twist and thereby affect the steering mechanism.

The foregoing as well as other objects will be made more apparent as this description proceeds, especially when considered in connection with the accompanying drawings, wherein:

Figure 1 is a fragmentary side elevational view of the front end of a motor vehicle embodying this invention and having certain parts broken away for the sake of clearness;

Figure 2 is a top plan view of the construction shown in Figure 1;

Figure 3 is a rear elevational view of the construction shown in Figure 1 with certain parts in section;

Figure 4 is a view similar to Figure 1 showing a slightly modified form of construction;

Figure 5 is an enlarged sectional detail view of the anti-shimmy device illustrated in Figure 1.

Referring now more in detail to the drawings, it will be noted that I have illustrated in the several figures the steering mechanism side of a vehicle comprising a frame 10 having a side sill 11 and having an axle 12 operatively connected to the sill 11 through the medium of a multiple leaf spring 13. The spring 13 extends beneath the axle 12 and is rigidly connected thereto intermediate the ends thereof by means of the spring clips 14. By locating the spring beneath the axle, the distance between the spring and surface with which the wheels engage is minimized, and, as a consequence, the reaction of the brakes is transferred more directly to the frame through the spring with the result that twisting of the spring or rocking of the axle upon application of the brakes is reduced. As this description proceeds, however, it will be apparent that the present invention may also be advantageously employed for accomplishing the desired results in a combination wherein the spring is positioned upon the top of the axle, and for this reason, such a construction should be considered as coming within the spirit and scope of this invention.

In the illustrative embodiment of the invention, the front end of the spring 13 is connected to the front end of the sill member 11 by means of a shackle 15 having the lower end pivotally connected to the main leaf of the spring 13 in the usual manner and having the upper end pivotally connected to the front horn of the sill 11. In the present instance, the rear end of the spring is connected to the sill 11 through the medium of an elastic anchorage or anti-shimmy device 16 designed to permit a restricted travel of the spring and associated end of the axle longitudinally relative to the sill 11.

While any one of the numerous types of anti-shimmy devices may be employed herein, nevertheless, for the purpose of illustration, I have shown the same as comprising a bracket 17 having the lower end pivotally connected to the rear end of the spring 13 through the medium of a rubber bushing 18. The upper end of the bracket 17 is connected at spaced points to the sill 11 through the medium of the rubber bushings 19 and 20. As is usually the case in connections of this character, the rubber bushings are assembled under compression, and, in the present instance, the rubber bushing 20 is compressed to a lesser degree than the rubber bushing 19 so as to provide for a shifting movement of the bracket longitudinally relative to the sill 11.

Mounted upon opposite ends of the axle 12 is a pair of steering wheels, only one of which is shown herein for the purpose of illustration. The steering wheel shown herein is designated by the reference character 21 and is connected to the axle through the medium of a steering knuckle 22 pivotally connected to the axle on the inclined axis indicated by the dot and dash line 23 in Figure 3. In accordance with conventional practce, a brake supporting plate 24 is mounted on the steering knuckle and a brake is supported by the plate 24 for cooperation with a brake drum 26 secured to the wheel in any suitable manner.

Extending inwardly from the lower end of the steering knuckle is an arm 27 detachably secured to the steering knuckle by means of a suitable bolt 28. The inner end of the arm 27 is provided with a ball 29 formed integral therewith and fashioned to engage in a socket 30 formed in the forward end of a drag link 31. The drag link extends rearwardly from the arm 27 and is operatively connected to the steering gear 30' through the medium of a steering arm 32. Extending rearwardly from the steering knuckle 22 and preferably formed integral with the arm 27 is a second arm 33 pivotally connected to the steering knuckle of the opposite wheel through the medium of a connecting rod 34 for actuating this wheel. The connecting rod 34 extends in the direction of the axle 12 and the drag link 31 is bent downwardly as at 35 in order to provide the necessary deflection clearance for the connecting rod.

With the construction as thus far described, it will be apparent that application of the front brakes applies an additional load upon the springs 13 and deflects the latter causing the axle to rock about a longitudinal axis in a forward direction indicated by the arrow 36 in Figure 1. Inasmuch as the ball connection between the arm 27 and the drag link 31 is connected to the axle through the steering knuckle in such a manner that this connection would be affected by rocking of the axle, it has been proposed to locate the center of the ball upon the longitudinal axis about which the axle rocks upon application of the brakes which is usually in the locality of the top leaf of the spring as shown in the modification illustrated in Figure 4. The location of the ball on the aforesaid longitudinal axis is satisfactory to prevent oscillation of the ball 29 upon rocking movement of the axle in constructions of the type shown in Figure 4 wherein one end of the spring 13 is fixed relative to the sill 11. However, the location of the center of the ball 29 on the longitudinal axis about which the axle rocks when the brakes are applied is not satisfactory for effecting the desired results in an assembly of the type shown in Figures 1 to 3 embodying a kick shackle or anti-shimmy device since the longitudinal displacement of the spring and axle permitted by this device introduces an error in the mechanism which, if not compensated for, causes a diving of the steering wheels 21 of the vehicle to the right as viewed in Figure 3.

In order to clearly illustrate the foregoing, it will be assumed that the construction shown in Figure 4 is provided with a kick shackle designed to permit longitudinal displacement of the spring and associated end of the axle. In the construction shown in Figure 4, the center of the ball is located in the longitudinal axis about which the axle rocks when the brakes are applied so that rocking movement of the axle in a forward direction about said axis will not affect the position of the ball 29. However, it will be apparent that when the brakes are applied, the front spring and associated end of the axle moves rearwardly and in so doing tends to effect a corresponding movement of the ball 29. The ball 29 is prevented from rearward movement, however, owing to the fact that the drag link is being held by the operator through the medium of the steering gear with the result that the steering wheel will be turned to the right owing to the connection between the associated knuckle and ball. This action materially complicates operation of the vehicle and in many cases may prove extremely serious.

In accordance with the present invention as illustrated in Figures 1 to 3, inclusive, any tendency for the axle to rock upon application of the brakes and any tendency for the same to move rearwardly due to the kick shackle as the brakes are applied is prevented from having any material effect upon the steering. As previously stated, in a construction of the type shown in Figure 1 embodying a kick shackle, application of the brakes not only tends to rock the axle forwardly as viewed in Figure 1, but also tends to move the same rearwardly a distance corresponding to the play instituted in the mechanism by the kick shackle or anti-shimmy device 16. For reasons hereinbefore set forth, the location of the ball on the longitudinal axis about which the axle rocks upon application of the brakes will not compensate for the rearward displacement of the axle due to the anti-shimmy device, and, accordingly, the center of the ball 29 is accurately located upon a predetermined axis offset from the normal longitudinal axis about which the axle tends to rock upon application of the brakes. In the present instance, the axis of the ball 29 is designated herein by the reference character 40 and is positioned above the longitudinal axis about which the axle rocks when the brakes are applied.

With the relationship set forth in the preceding paragraph, it will be noted that application of the front wheel brakes causes the central portions of the front springs 13 to move upwardly relative to the frame due to the additional load transferred thereto by the brakes and the reaction of the latter imparts a twisting moment to the axle tending to rock the same in the direction of the arrow 36 about the axis 41. Inasmuch as the axis 40 of the ball is spaced above the axis 41 and since the ball is carried by the axle, it will be apparent that the same tends to move with the axle forwardly from its position shown in Figure 1. However, the reaction of the spring to the braking also simultaneously effects a rearward movement of the spring and associated end of the axle due to the anti-shimmy device 16. Owing to the connection between the ball 29 and axle previously described, it will be apparent that rearward movement of the axle tends to effect a corresponding rearward displacement of the ball which is counteracted by the aforesaid tendency to move the ball forwardly. The location of the axis 40 of the ball is such that the tendency to move the ball forwardly upon rocking of the axle is neutralized by the tendency to move the axle rearwardly, and, accordingly, application of the brakes will have virtually no effect upon the ball or steering mechanism.

While the invention as previously set forth may be employed with facility in connection with various constructions of front axles, nevertheless, I prefer to employ an axle substantially tubular in cross section due to the torsional resisting qualities of such a section. Although an axle of tubular cross section is not essential to the present invention as expressed above, nevertheless, it is desirable since it cooperates in preventing the reaction of the axle to the braking from having any effect upon the steering.

For the purpose of illustrating the manner in which the axle shown herein cooperates in effecting the desired results previously stated, the cooperative qualities of the axle will be described in connection with both Figures 1 and 4. Perhaps the most expedient manner of explaining the advantages derived by employing an axle of tubular cross section in the present combination is to compare the function of the same with an axle of the conventional I-beam or similar design. Axles of this latter type possess considerably less resistance to torsion than the tubular type illustrated herein, with the result that a twisting force of relatively small magnitude applied to one end of axles of the I-beam design would be sufficient to effect a rocking movement of the aforesaid end thereof relative to the other. Such a condition would effect a displacement of the ball 29, and for reasons specified above cause a turning of the front wheels. On the other hand, when employing a tubular axle, this twisting moment would be resisted to such an extent that the same would have no material effect upon the location of the ball. The foregoing objection to axles of the I-beam type also applies to Figure 4 since twisting of the axle would probably not take place about the longitudinal axis through the center of the ball, and, accordingly, would effect a displacement of the latter which would be transmitted to the steering wheels of the vehicle. It is urged, therefore, that the provision of an axle of tubular cross section in both Figures 1 and 4 appreciably affects the efficiency of the combination.

Although in describing the present invention particular stress has been placed upon the location of the springs 13 beneath the axle, nevertheless, it should be understood that the invention is also applicable to constructions wherein the spring is secured upon the top of the axle. In the event the spring is positioned upon the top of the axle, the longitudinal axis about which the latter tends to rotate upon application of the brakes is still in the neighborhood of the main top leaf of the spring, and, accordingly, in order to obtain the desired results specified above, it is only necessary to raise the ball 29 in Figure 1 above the aforesaid axis, and in the construction shown in Figure 4 to raise the ball to a position in this axis. In view of the various different arrangements which may be resorted to without affecting the scope of this invention, reservation is made to make such changes as may come within the purview of the accompanying claims.

What I claim as my invention is:

1. In a motor vehicle, the combination of a frame, an axle, a spring extending longitudinally of the frame and connected intermediate the ends thereof to said axle, means connecting opposite ends of the spring to the frame permitting restricted movement of said ends longitudinally of the frame, a steering knuckle pivoted to the axle, a wheel mounted on said knuckle, braking means for the wheel, a steering gear carried by the frame, and means connecting said steering gear to the knuckle including a member pivotally connected to said knuckle at a point so positioned with respect to the axis about which the axle tends to rock as the brakes are applied that the reaction of the axle to the braking has no effect upon the steering.

2. In a motor vehicle, the combination of a frame, an axle, a spring extending longitudinally of the frame and connected intermediate the ends thereof to said axle, means connecting opposite ends of the spring to the frame permitting restricted movement of said ends longitudinally of the frame, a steering knuckle pivoted to the axle, a wheel mounted on said knuckle, braking means for the wheel, a steering gear carried by the frame, and means connecting said steering gear to the knuckle including a member pivotally connected to said knuckle at a point offset a predetermined distance in such a direction from the longitudinal axis about which the axle rocks as the braking means is applied that the force acting upon said pivot as the axle rocks about said axis tends to move the pivot in a direction opposite to the direction of movement thereof occasioned by the displacement of the spring and associated end of the axle under the action of the braking means.

3. In a motor vehicle, the combination of a frame, an axle, a spring extending longitudinally of the frame and connected intermediate the ends thereof to said axle, means connecting opposite ends of the spring to the frame permitting restricted movement of said ends longitudinally of the frame, a steering knuckle pivoted to the axle, a wheel mounted on said knuckle, braking means for the wheel, a steering gear carried by the frame, and means connecting said steering gear to the knuckle including a member pivotally connected to said knuckle at a point so located with respect to the axis about which the axle tends to rock as the brakes are applied that the reaction of the axle to the braking means exerts opposed forces on said pivot tending to move the same in opposite directions.

4. In a motor vehicle, the combination of a frame, an axle, a spring extending longitudinally of the frame and connected intermediate the ends thereof to said axle, means connecting opposite ends of the spring to the frame permitting restricted movement of said ends longitudinally of the frame, a steering knuckle pivoted to the axle, a wheel mounted on said knuckle, braking means for the wheel, a steering gear carried by the frame, and means connecting said steering gear to the knuckle including a member pivotally connected to said knuckle at a point so located that the reaction of the axle to the braking means exerts opposed forces on said pivot tending to move the same in opposite directions and the location of said point being so determined that the two aforesaid forces neutralize each other without effecting movement of the pivot in either of said directions.

5. In a motor vehicle, the combination of a frame, an axle, a spring connecting the frame and axle and extending beneath the latter, means connecting opposite ends of the spring to the frame permitting restricted movement of said spring and associated end of the axle longitudinally of the frame, a steering knuckle pivoted to the axle, a wheel mounted on said steering knuckle, braking means for the wheel, a steering gear carried by the frame, and means connecting said steering gear to the knuckle including a member pivotally connected to said knuckle at a point so located with respect to the axis about which the axle tends to rock as the brakes are applied that the reaction of the axle to the braking means exerts opposed forces of equal magnitude on said pivot tending to move the latter in opposite directions.

6. In a motor vehicle, the combination of a frame, an axle, a spring extending longitudinally of the frame and connecting the latter to the axle, means connecting opposite ends of the spring to the frame permitting restricted movement of the spring and associated end of the axle longitudinally of the frame, a steering knuckle pivoted to the axle, a wheel mounted on said steering knuckle, braking means for the wheel, a steering gear carried by the frame, and means connecting said steering gear to the knuckle including a member pivotally connected to said knuckle at a point spaced above the connection of the spring to the axle a distance so determined that the reaction of the axle to the braking means exerts opposed forces on said pivot of substantially equal magnitude.

7. In a vehicle, the combination of a frame, an axle substantially tubular in cross section, a spring extending longitudinally of the frame and connecting the latter to the axle, means connecting opposite ends of the spring to the frame providing for restricted movement of the spring and associated end of the axle longitudinally of the frame, a steering knuckle pivoted to the axle, a wheel mounted on said knuckle, braking means for the wheel, a steering gear carried by the frame, a connecting rod extending between the steering gear and knuckle and pivotally connected to said knuckle at a point so located with respect to the axis about which the axle tends to rock as the brakes are applied that the reaction of the axle to the braking means exerts opposed forces on said pivot tending to move the same in opposite directions.

8. In a motor vehicle, the combination of a frame, an axle substantially tubular in cross section, a spring extending beneath the axle and connected intermediate the ends thereof to said axle, means connecting opposite ends of the spring to the frame permitting restricted movement of the spring and associated end of the axle longitudinally of the frame, a steering knuckle pivoted to the axle, a wheel mounted on said knuckle, braking means for the wheel, a steering gear carried by the frame, and a connecting rod extending between the steering gear and knuckle and pivotally connected to said knuckle at a point spaced a predetermined distance above the axis about which the axle tends to rock as the brakes are applied.

9. In a motor vehicle, the combination of a frame, an axle, spring means connecting the axle to the frame, a steering knuckle pivoted to the axle, a wheel mounted on said steering knuckle, braking means for the wheel anchored upon said axle whereby actuation of the braking means tends to rock said axle forwardly and tends to deflect the associated end of the axle rearwardly, and a link pivotally connected to the knuckle at a point spaced above the axis about which the axle tends to rock as the brakes are applied a distance so determined that the reaction of the axle to the braking means exerts the opposed forces on said pivot of substantially equal magnitude.

EARLE S. MacPHERSON.